(12) United States Patent
Luke et al.

(10) Patent No.: US 11,954,379 B2
(45) Date of Patent: Apr. 9, 2024

(54) PREDICTED PRINT MATERIAL USAGE ADJUSTMENT

(71) Applicant: Hewlett-Packard Development Company, L.P., Spring, TX (US)

(72) Inventors: Jeffrey H. Luke, Boise, ID (US); Gabriel S. McDaniel, Boise, ID (US); Scott K. Hymas, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/921,119

(22) PCT Filed: May 26, 2020

(86) PCT No.: PCT/US2020/034505
§ 371 (c)(1),
(2) Date: Oct. 25, 2022

(87) PCT Pub. No.: WO2021/242217
PCT Pub. Date: Dec. 2, 2021

(65) Prior Publication Data
US 2023/0176796 A1 Jun. 8, 2023

(51) Int. Cl.
*G06F 3/12* (2006.01)
*G06F 16/29* (2019.01)
*H04N 1/00* (2006.01)
*H04N 1/60* (2006.01)

(52) U.S. Cl.
CPC .......... *G06F 3/1219* (2013.01); *G06F 3/1211* (2013.01); *G06F 3/1229* (2013.01); *G06F 3/1235* (2013.01); *G06F 16/29* (2019.01); *H04N 1/00814* (2013.01); *H04N 1/6091* (2013.01); *G06F 3/1205* (2013.01); *G06F 3/1218* (2013.01); *G06F 3/1255* (2013.01)

(58) Field of Classification Search
None
See application file for complete search history.

(56) References Cited

U.S. PATENT DOCUMENTS

| | | |
|---|---|---|
| 5,655,174 A | 8/1997 | Hirst |
| 6,560,417 B1 * | 5/2003 | Rodriguez ......... G03G 15/5033 399/27 |
| 6,633,732 B2 | 10/2003 | Siegel et al. |
| 7,206,526 B2 | 4/2007 | Kobayashi |
| 9,753,684 B1 | 9/2017 | Najari et al. |
| 10,073,399 B1 | 9/2018 | Osadchyy et al. |
| 11,704,522 B2 * | 7/2023 | Sato ..................... B41J 2/16579 358/1.14 |
| 2004/0126124 A1 | 7/2004 | Inoue et al. |

(Continued)

FOREIGN PATENT DOCUMENTS

DE 10253924 A1 6/2003

*Primary Examiner* — Miya J Cato
(74) *Attorney, Agent, or Firm* — Michael Dryja

(57) ABSTRACT

The location of a printing device is determined. Environmental conditions in which the printing device operated when printing a print job are determined based on the determined location. An environmental adjustment factor for the printing device is determined based on the determined environmental conditions. A predicted print material usage of the printing device in printing the print job is adjusted based on the determined environmental adjustment factor.

13 Claims, 7 Drawing Sheets

(56) References Cited

U.S. PATENT DOCUMENTS

| | | | |
|---|---|---|---|
| 2007/0024655 A1* | 2/2007 | Masashi | B41J 29/393 |
| | | | 347/14 |
| 2009/0296156 A1 | 12/2009 | Mestha et al. | |
| 2011/0069977 A1 | 3/2011 | Yasukawa et al. | |
| 2013/0013765 A1* | 1/2013 | Iwanami | G03G 15/55 |
| | | | 709/224 |
| 2017/0262243 A1* | 9/2017 | Najari | H04L 67/53 |
| 2020/0338907 A1* | 10/2020 | Shinkai | B41J 2/2135 |
| 2022/0137534 A1* | 5/2022 | Mochizuki | G03G 15/556 |
| | | | 399/284 |

\* cited by examiner

PREDICTED PRINT MATERIAL USAGE ADJUSTMENT

BACKGROUND

Printing devices can use a variety of different technologies to form images on media such as paper or to build three-dimensional (3D) objects. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner, ink (which can include other printing fluids or material as well), or 3D print material.

DETAILED DESCRIPTION

Figure 1:
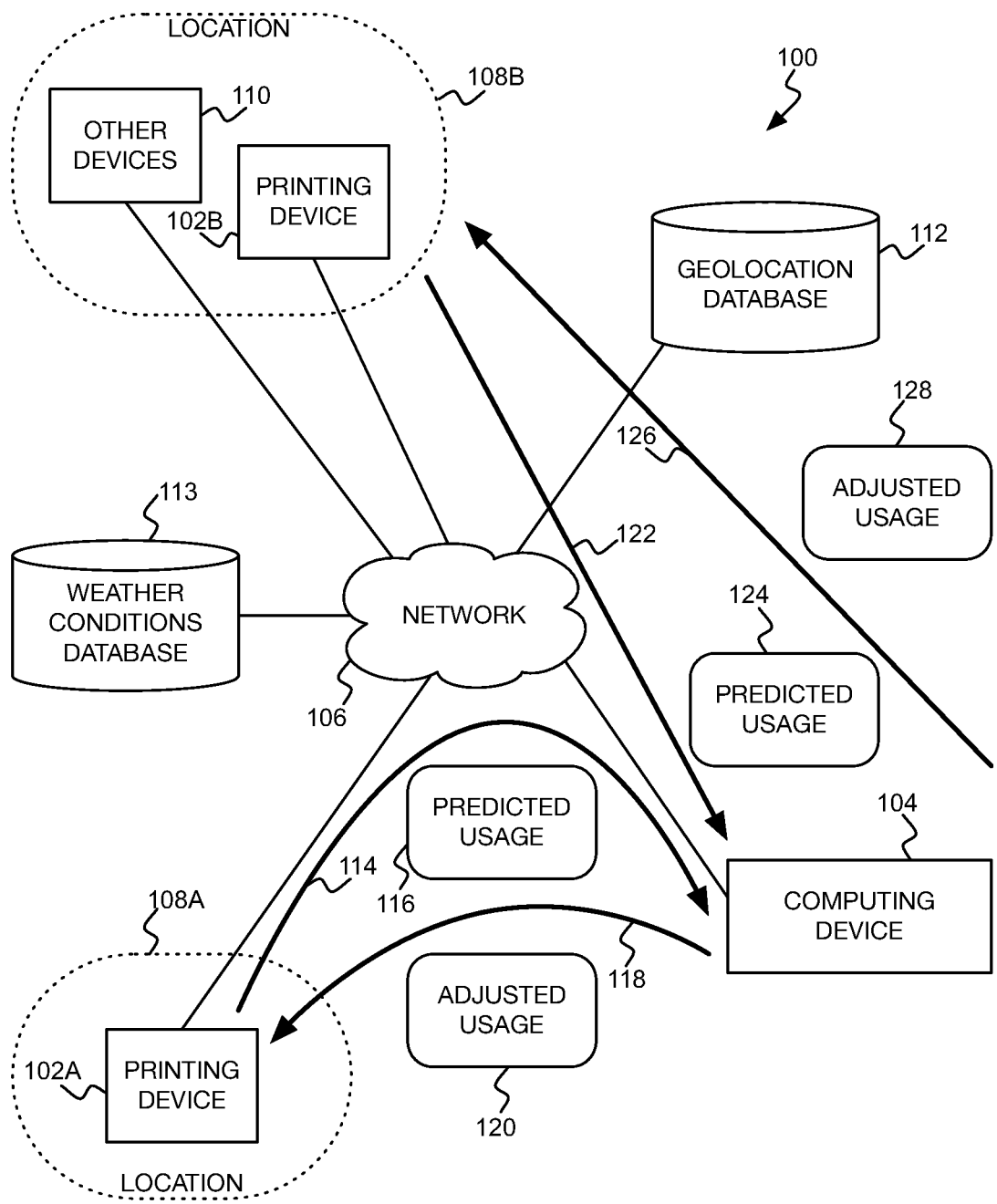
FIG. 1 is a diagram of an example system for adjusting predicted print material usage.

As noted in the background, printing devices deposit print material to form images on media or, in the case of three-dimensional (3D) printing devices, to additively build (3D) objects. The environmental conditions, including temperature, humidity, and other environmental conditions, in which a printing device is operating can affect how much print material the device uses to print a given print job. For example, toner charge properties may change with humidity, which can result in greater toner consumption when a print job is printed in a high humidity environment as compared to in a low humidity environment.

Printing devices or their print material supplies may include print material sensors that can directly measure how much print material is being used as print jobs are printed, or that can directly detect when the supplies are low or empty. Inclusion of such sensors can increase printing device cost and/or increase the cost of replacement print material supplies, such as colorant cartridges like toner and inkjet cartridges. For cost and other reasons, therefore, manufacturers may forego including such sensors within printing devices and/or replacement print material supplies.

Printing devices may additionally or instead include environmental sensors that can measure the environmental conditions in which the devices are operating as print jobs are printed. Such a printing device may then adjust a predicted or nominal print material usage for a given print job based on the actual environmental conditions of the device when printing the print job, as directly measured by the printing device itself. Inclusion of these sensors can also increase printing device cost, and therefore for cost and other reasons manufacturers may forego including such sensors.

Inaccurately tracking the remaining print material supply within a printing device can result in erroneous notifications that the device has depleted the currently installed supply. Therefore, the print material supply may be prematurely replaced with a replacement supply, which wastes print material and increases cost, both monetarily and environmentally. In some cases, to extend the lifetime of the currently installed print material supply, a printing device may switch to an operating mode in which print material is conserved by reducing the amount used for a given print job, albeit with reduced print quality. Prematurely switching to this operating mode thus unnecessarily affects print quality.

Techniques described herein ameliorate these and other issues. The location of a printing device is determined, such as based on its identifier like a network address. The environmental conditions in which the printing device operated when printing a print job are determined based on the device's determined location. An environmental adjustment factor is determined based on the environmental conditions. The predicted material usage of the printing device in printing the print job is adjusted based on the determined environmental adjustment factor.

The techniques described herein can thus more accurately track the remaining print material supply within a printing device even if the device and the supply lack a print material sensor and/or the device lacks environmental sensors. Premature replacement of the print material supply is therefore less likely to occur. Furthermore, the printing device is less likely to switch to an operating mode in which print material is conserved by reducing the amount used for a given print job, and as such optimal print quality can be maintained for a larger number of jobs.

FIG. 1 shows an example system 100. The system 100 includes printing devices 102A and 102B, which are collectively referred to as printing devices 102, and a computing device 104. The printing devices 102 may be standalone printers or all-in-one (AIO) devices that combine printing functionality with other functionality, such as scanning functionality. The computing device 104 may be a server or another type of computing device. The printing devices 102 and the computing device 104 are communicatively connected to a network 106, such as wired or wireless networks, intranets, extranets, the Internet, and so on.

As depicted in FIG. 1, the printing devices 102 may be directly connected to the network 106 without an intermediary host computing device like a desktop or laptop computer. For instance, a printing device 102 may include a wired network port, such as an Ethernet port, and/or may have wireless communication capability, such as Wi-Fi or another type of wireless local area network (WLAN) communication capability. In another implementation, however, either or both printing device 102 may be communicatively connected to a host computing device, such as via a universal serial bus (USB) wired connection or a Bluetooth wireless connection. In such an implementation, the host computing device is communicatively connected to the network 106, and the printing device 102 communicates over the network 106 through the host computing device.

The printing devices 102A and 102B are respectively located at different locations 108A and 108B, which are collectively referred to as the locations 108. The locations 108 may be different geographic locations, such as different cities, counties, states or provinces, and countries, different buildings at the same geographic location, different floors within the same building, different locations within the same floor of the same building, and so on. In the example of FIG. 1, other devices 110, which may be printing devices, computing devices, or other types of devices, are also depicted at the location 108B, and are similarly communicatively connected to the network 106.

A geolocation database 112 and a weather conditions database 113 are communicatively connected to the network 106 as well. The databases 112 and 113 may be operated as the same or different services, such as web services, by the same or different computing devices, and in one implementation may be operated by the computing device 104 itself. The geolocation database 112 maps device identifiers, such as network addresses like Internet Protocol (IP) addresses, to geographic location. The weather conditions database 113 provides current outdoor and/or historical environmental conditions, such as temperature and/or humidity, by geographic location.

In general operation, the computing device 104 adjusts the predicted (e.g., nominal) print material usage of a printing device 102 in printing a given print job to take into account the environmental conditions of the device 102 in question when printing the print job. Each printing device 102 and its installed print material supply may lack a print material sensor that can directly track such usage or detect when the supply is running low or has been depleted. Each printing device 102 may also or instead lack an environmental sensor that can directly measure the environmental conditions in which the device 102 in question is operating.

For instance, upon printing a print job, the printing device 102A as indicated by arrow 114 transmits the predicted print material usage 116 used in printing the print job to the computing device 104 via the network 106. The computing device 104 determines the location 108A of the printing device 102A, such as by looking up the identifier of the device 102A within the geolocation database 112. The computing device 104 determines the environmental conditions of the printing device 102A when printing the print job based on the determined location 108A, such as by looking up the location 108A of within the weather conditions database 113.

The computing device 104 determines an environmental adjustment factor based on the determined environment conditions of the printing device 102A in printing the print job, such as by applying rules to the conditions, looking up the environmental conditions within a table, or in a machine learning based on the conditions. The computing device 104 adjusts the predicted print material usage 116 provided by the printing device 102A. As indicated by arrow 118, the computing device 104 then transmits the adjusted predicted print material usage 120 back to the printing device 102A via the network 106. The printing device 102A can thus more accurately track its remaining print material supply as the device 102A prints print jobs.

Similarly, upon printing a print job, the printing device 102B as indicated by arrow 122 transmits the predicted print material usage 124 used in printing the print job to the computing device 104. The computing device 104 determines the location 108B of the printing device 102A, such as by matching the identifier of the device 102A to the identifiers of the other devices 110 if the location 108B of the devices 110 is known. The computing device 104 determines the environmental conditions of the printing device 102B when printing the print job based on the determined location 108B. For example, one or multiple of the other devices 110 at the same location 108B may have measured and reported the actual environmental conditions at the location 108B.

The computing device 104 similarly determines an environmental adjustment factor based on the determined environmental conditions of the printing device 102B in printing the print job. The computing device 104 adjusts the predicted print material usage 124 provided by the printing device 102B. As indicated by arrow 126, the computing device 104 then transmits the adjusted predicted print material usage 128 back to the printing device 102B. The printing device 102B therefore can also more accurately track its remaining print material supply as the device 102B prints print jobs.

Figure 2:
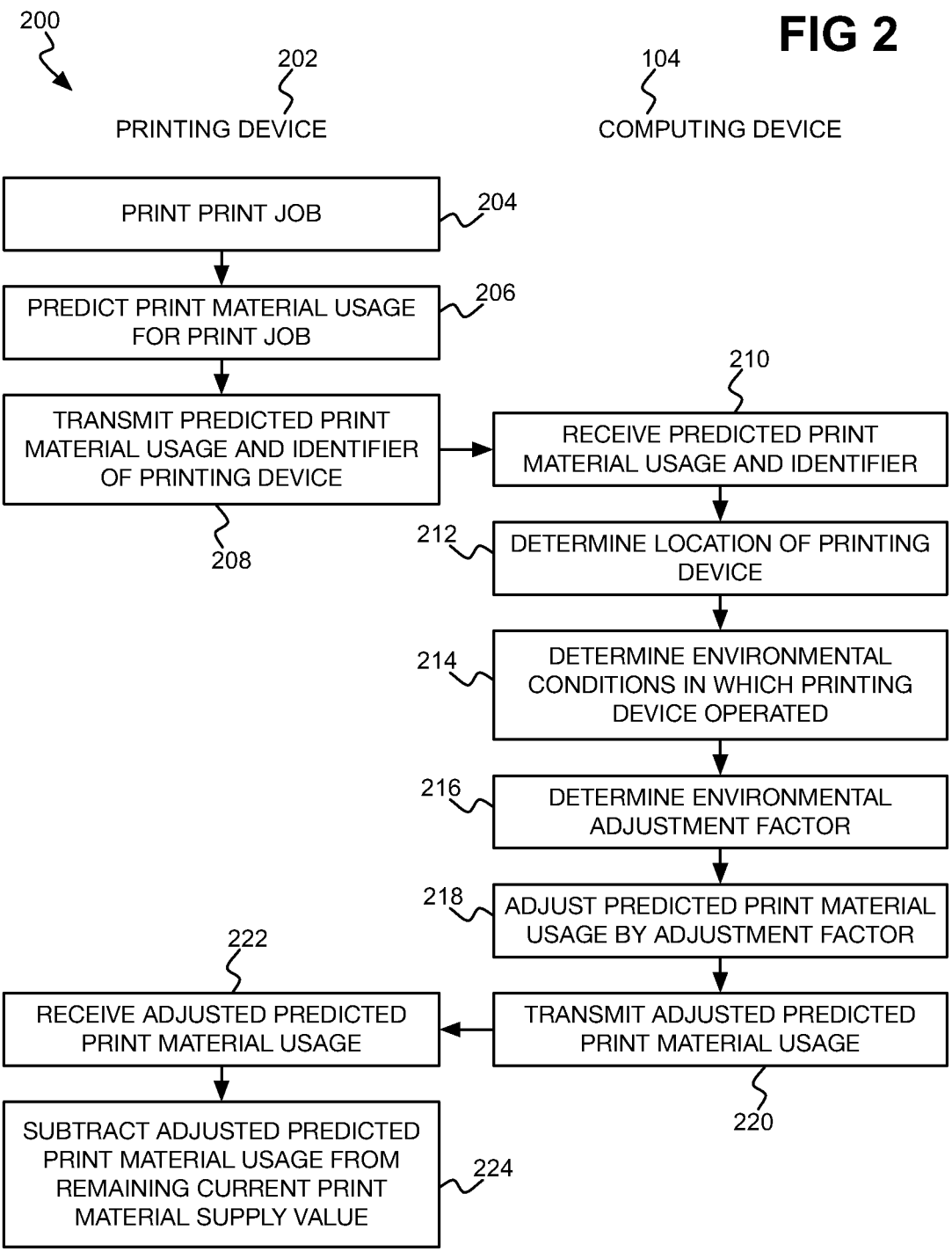
FIG. 2 is a flowchart of an example method for adjusting predicted print material usage.

FIG. 2 shows an example method 200. The parts of the method 200 in the left column can be performed by a printing device 202, such as by either printing device 102. The parts of the method 300 in the right column can be performed by the computing device 104. The method 200 may be implemented as program code stored on a non-transitory computer-readable data storage medium and executable by a processor, such as that of the printing device 202 or the computing device 104. The method 200 is performed each time the printing device 202 is to print a new print job.

The printing device 202 thus prints the print job (204), and predicts the print material usage for the print job (206). The predicted print material usage is the amount of print material that the printing device 202 determines the device 202 has used in printing the print job. The predicted print material usage can be the number of printed pixels of the print job, for instance. The printing device 202 transmits the predicted print material usage and its identifier to the computing device 104 (208). The identifier may be the network address, such as the IP address, of the printing device 202.

The computing device 104 in turn receives the predicted print material usage and the identifier of the printing device 202 (210). The computing device 104 determines the location of the printing device 202, such as based on the identifier of the device 202 (212). A particular approach by which the computing device 104 can determine the location of the printing device 202 using the identifier of the device 202 is described later in the detailed description.

The computing device 104 then determines the environmental conditions, such as temperature and/or humidity, in which the printing device 202 operated when printing the print job having the predicted print material usage, based on the determined location of the device 202 (214). The computing device 104 determines an environmental adjustment factor for the printing device 202, based on the determined environmental conditions of the device 202 (216). Particular approaches by which the computing device 104 can determine the environmental conditions and the environmental adjustment factor are described later in the detailed description.

The environmental adjustment factor can indicate how much more or less print material is used by the printing device when operating in the determined environmental conditions, as compared to nominal (e.g., optimal or ideal) environmental conditions. For example, the environmental adjustment factor may be one for typical controlled indoor ambient environmental conditions, and be greater or less than one as the environmental conditions deviate from these conditions. The typical control indoor ambient environmental conditions may include an assumed temperature and humidity of a typical climate-controlled office environment, for instance.

The computing device 104 adjusts the predicted print material usage by (i.e., based on) the determined environmental adjustment factor (218). For example, the computing device 104 may multiply the predicted print material usage by the environmental adjustment factor, yielding an adjusted predict print material usage of the printing device 202 in printing the print job in question. The adjusted predicted print material usage may be less than, equal to, or greater than the unadjusted print material usage. The computing device 104 transmits the adjusted predicted print material usage to the printing device 202 (220).

The printing device 202 responsively receives the adjusted predicted print material usage (222). The printing device 202 can subtract the adjusted predicted print material usage from a value corresponding to the remaining current supply of print material of the device (224). For instance, when a new print material supply, such as a new print supply cartridge like a toner or ink cartridge, is installed within the printing device 202, the device 202 may reset the value to a maximum. As the printing device 202 prints print jobs, the device 202 may reduce the value by the adjusted predicted print material usage for each job to track the remaining print material.

Figure 3:
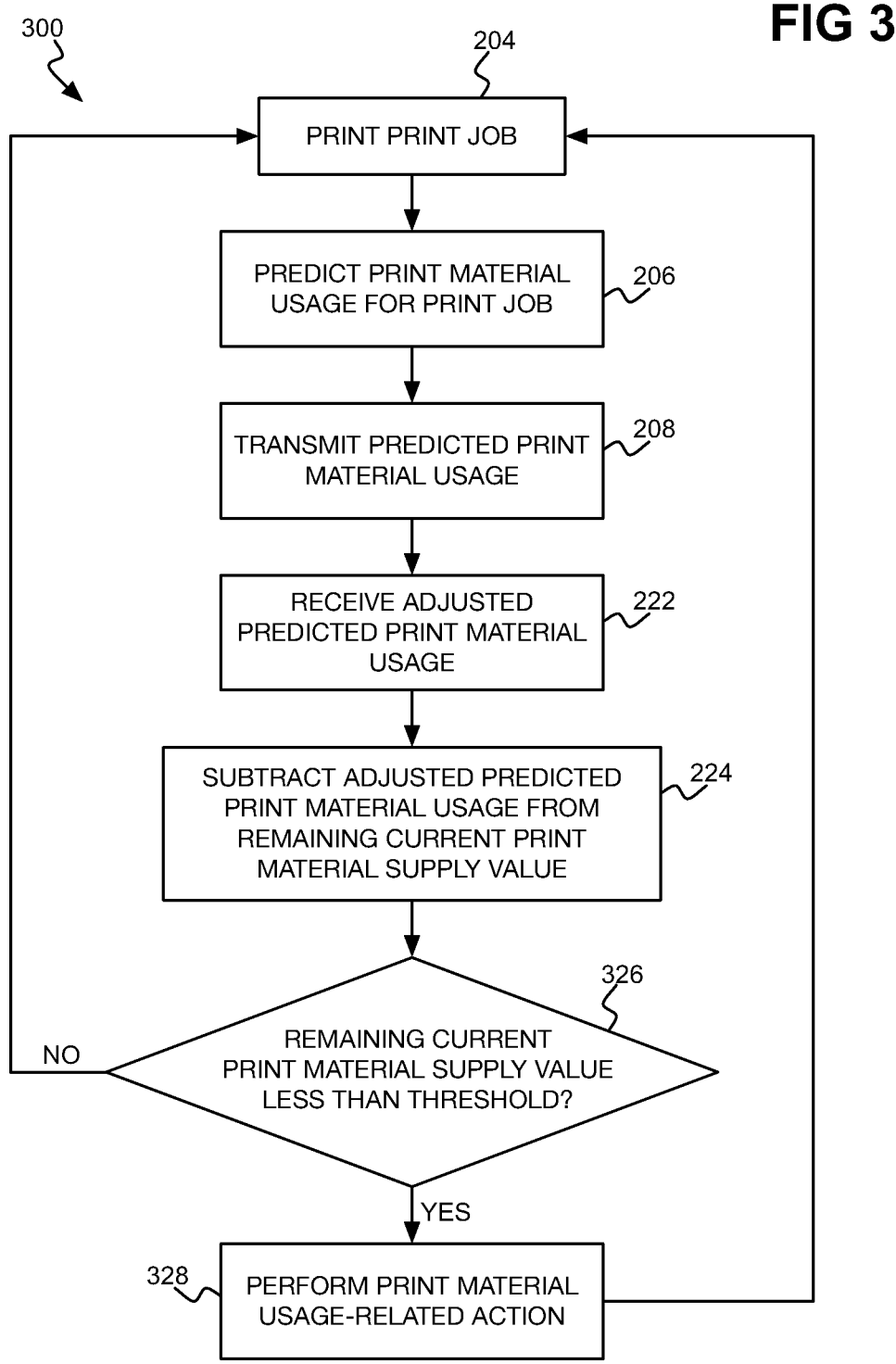
FIG. 3 is a flowchart of an example method for tracking remaining print material supply based on adjusted predicted print material usage.

FIG. 3 shows an example method 300. The parts of the method 300 can be performed by a printing device in one implementation, such as by either printing device 102 of FIG. 1. As with the method 200 of FIG. 2, the method 300 may be implemented as program code stored on a non-transitory computer-readable data storage medium and executed by a processor like that of the printing device. The printing device prints a print job (204), predicts the print material usage for the print job (206) and transmits the predicted print material usage (208), as has been described in relation to FIG. 2.

As has also been described in relation to FIG. 2, the printing device responsively receives the adjusted predicted print material usage for the print job (222), and subtracts the adjusted predicted print material usage from the value corresponding to the remaining print material of the current supply of the device (224). If the remaining current print material supply value is not less than a threshold (326), then the method 300 is repeated at part 204 the next time the printing device is to print another print job. At some point the remaining print material supply value reaches the threshold (i.e., becomes less than the threshold) (326), in which case the printing device performs a print material usage-related action (328) before repeating the method 300 at part 204. The action is thus performed based on the remaining print material supply as calculated using the adjusted predicted print material usage.

The threshold may correspond to a specified (low) amount of print material remaining within the current supply of the printing device. The print material usage-related action may be a notification on the printing device, for instance, to inform a user of the device that the remaining print material within the current supply is low. The action may be to switch operation of the printing device to a mode in which subsequent print jobs are printed using less print material from the current supply, such as by reducing the resolution of the print jobs, to conserve the remaining print material within the current supply.

Figure 4:
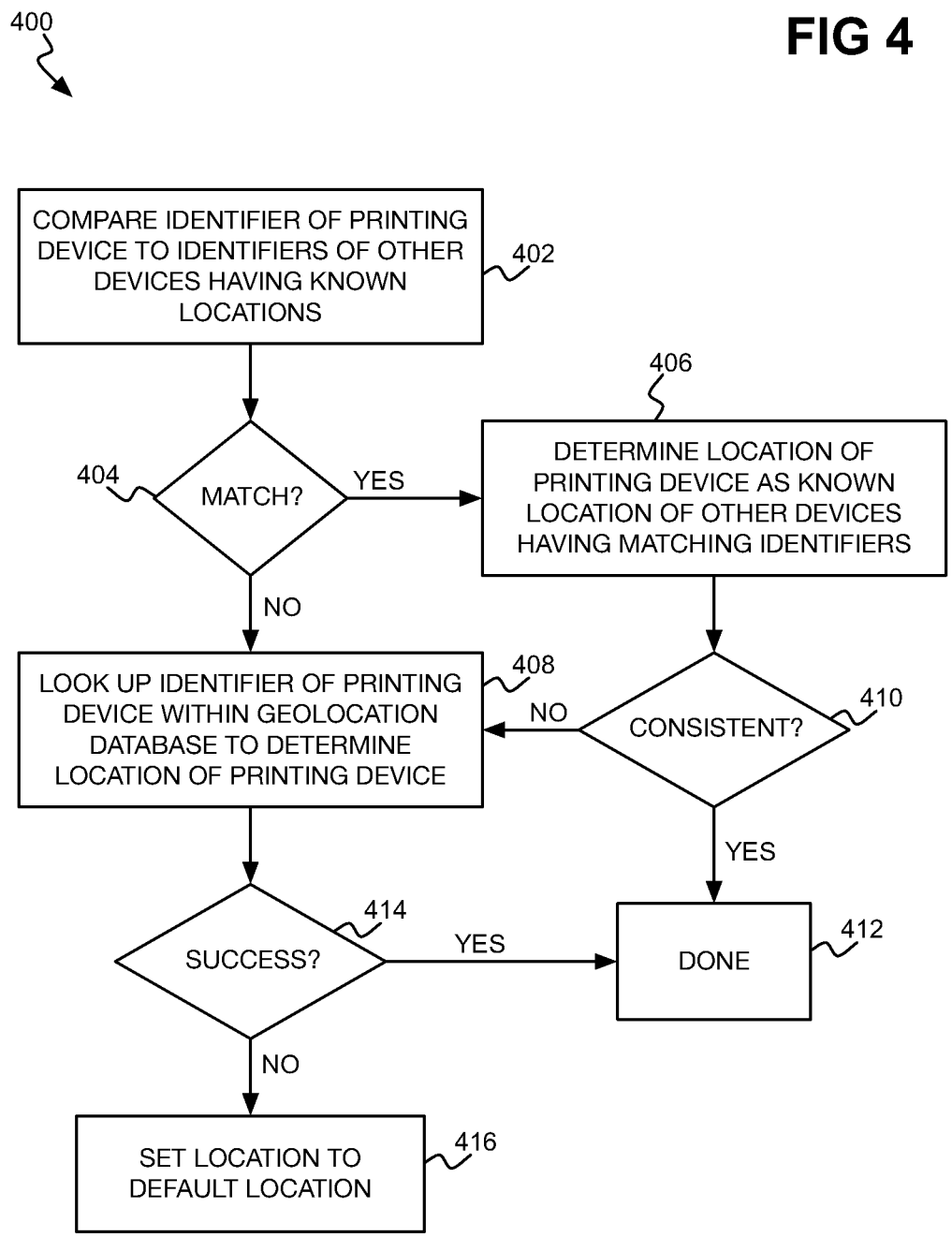
FIG. 4 is a flowchart of an example method for determining the location of a printing device.

FIG. 4 shows an example method 400 for determining the location of a printing device based on an identifier of the device. The method 400 can be performed by a computing device in one implementation, such as by the computing device 104 of FIG. 1. As with the method 200 of FIG. 2, the method 400 may be implemented as program code stored on a non-transitory computer-readable data storage medium and executed by a processor like that of the computing device. The identifier of the printing device in relation to which the method 400 is performed may be the device's network address, such as its IP address.

The computing device compares the identifier of the printing device to identifiers of other devices having known locations (402). For example, in FIG. 1, the other devices 110 at the same location 108B as the printing device 102B may have known locations. Such devices 110 may have global positioning system (GPS) sensors by which they determine their locations and report them to the computing device. As another example, the devices 110 may have had their locations previously specified by a network administrator at the location 108B, in which case the location 108B may be as specific as the building, building floor, or building floor location of the devices 110.

If the identifier of the printing device matches the identifiers of one or multiple other devices having known locations (404), then the computing device can determine the location of the printing device as the known location of the other devices having matching identifiers (406). For example, the IP address of the printing device may have the same subnet as the IP addresses of other devices, such that their identifiers match. If the known location of each other device on the same subnet is the same, then the location of the printing device may be set to this location.

If the identifier of the printing device does not match the identifier of another device having a known location (404), then the computing device may instead determine the location of the printing device by looking up its identifier within a geolocation database (408), such as the geolocation database 112 of FIG. 1. In FIG. 1, for instance, there are no other devices at the same location 108A as the printing device 102A, in contrast to the printing device 102 at the location 108B at which the other devices 110 also reside. The location 108A of the printing device 102A may thus be determined in accordance with part 408 of the method 400.

The geolocation database may map IP addresses to geographic locations. Therefore, the computing device can look up the IP address of the printing device to determine the printing device's geographic location. Depending on the IP address of the printing device, the geographic location may be resolved to a geographic location with more or less precision. For instance, some IP addresses may resolve to the city level or even the street level, whereas other IP addresses may resolve to the state or province level if not the country level.

In determining the location of the printing device as the known location of other devices having matching identifiers in part 406, the computing device may determine that the locations of the other devices having matching identifiers may be inconsistent. For example, the IP address of the printing device and the IP addresses of two other devices with known locations may have the same subnet. However, the locations of these other devices may be inconsistent, with the known location of one device differing from the known location of the other device.

If the locations of multiple other devices having identifiers matching the identifier of the printing device are inconsistent (410), the computing device may still determine the location of the printing device by looking up its identifier within a geolocation database (408), as described above. By comparison, if the locations of the other devices having matching identifiers are consistent (410), then the method 400 is finished (412). That is, the determined location of the printing device is the (consistent) location of these other devices having.

Furthermore, in one implementation, in determining the location of the printing device by looking up the identifier within a geolocation database in part 408, the computing device may be unsuccessful. For example, the IP address of the printing device may resolve to multiple locations, or the IP address may not resolve to any location. If determining the printing device's location using the geolocation database is unsuccessful (414), then it may be set to a default location, such as a default indoor climate-controlled environment. By comparison, if the determining the printing device's location using the geolocation is successful (414), then the method 400 is finished (412). That is, the determined location of the printing device is the location retrieved from the geolocation database based on the identifier of the printing device.

Figure 5:
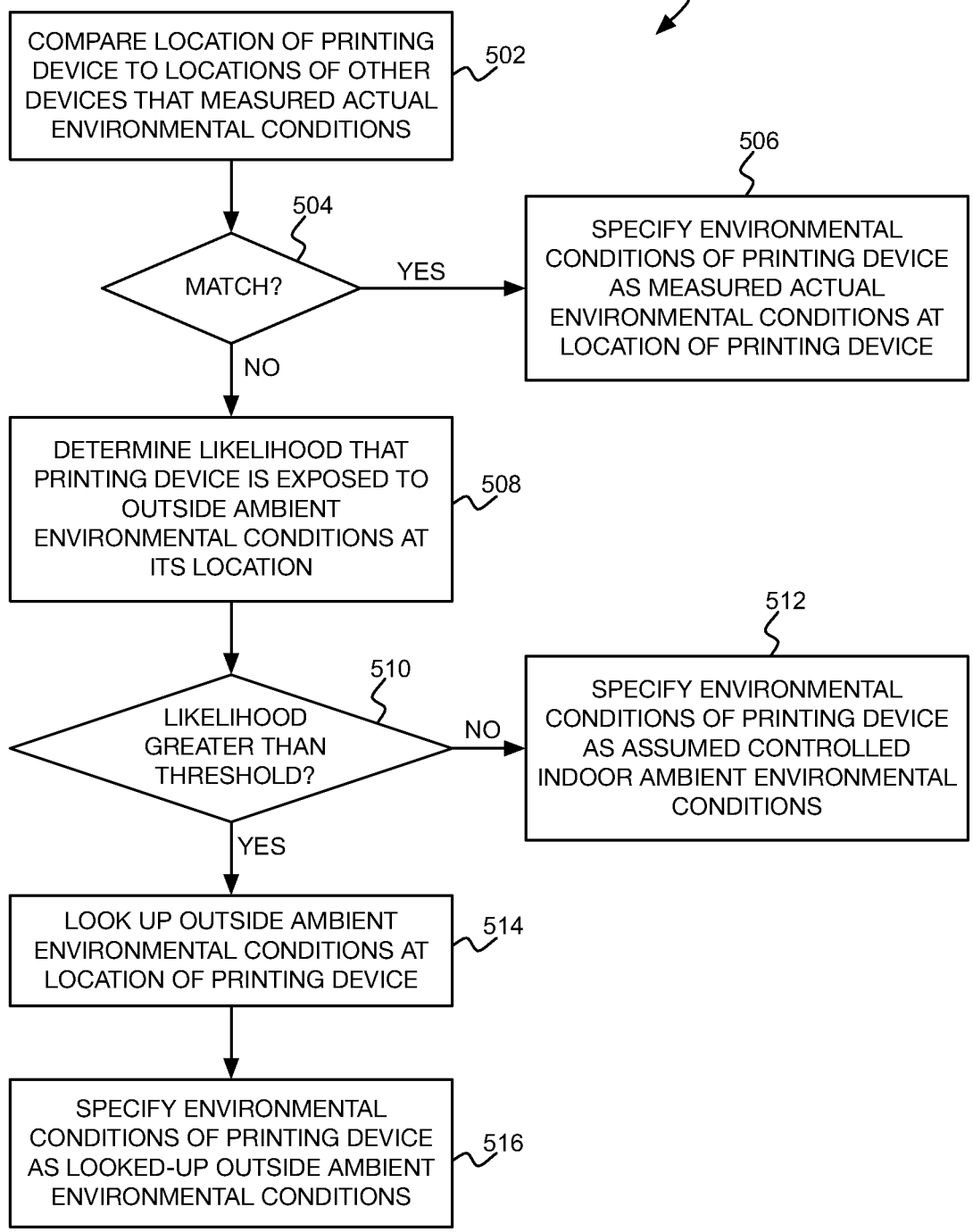
FIG. 5 is a flowchart of an example method for determining the environmental conditions of a printing device based on its location.

FIG. 5 shows an example method 500 for determining the environmental conditions in which a printing device is operated based on the location of the device. The method 500 can be performed by a computing device in one implementation, such as the computing device 104 of FIG. 1. As with the method 200 of FIG. 2, the method 500 may be implemented as program code stored on a non-transitory computer-readable data storage medium and executed by a processor like that of the computing device. The location of the printing device in relation to which the method 500 is performed may be the device's location determined per FIG. 4.

The computing device compares the location of the printing device to locations of other devices that measured their actual environmental conditions (502). For example, in FIG. 1, one or multiple of the other devices 110 at the same location 108B as the printing device 102B may have measured and reported their actual environmental conditions, such as temperature and/or humidity, to the computing device. If the location of the printing device matches the location of any other device that measured and reported its actual environmental conditions (504), then the computing device specifies these measured conditions as the (actual) environment conditions of the printing device.

However, if the location of the printing device does not match the location of any other device that measured its actual environmental conditions (504), then the computing device may instead determine the likelihood that the printing device is exposed to outside ambient conditions at its location (508). For example, the printing device may be located at a warehouse or in a non-climate controlled building, or even outside in a sheltered manner. Therefore, the likelihood that the printing device is exposed to outside ambient conditions is high, or even certain.

If the location of the printing device is not specified at this level of precision, however, the likelihood that the device is exposed to outside ambient conditions at its location can be determined in another way. For example, the geographic location of the device may be mapped to such likelihood by city, state or province, and/or country. Printing devices within developing countries, rural areas, and smaller cities (e.g., towns) may have a higher likelihood of exposure to outside ambient conditions than devices within developed countries, urban areas, and larger cities.

If the determined likelihood that the printing device is exposed to outside ambient environmental conditions at its location is less than a threshold (510), then the computing device may specify the printing device's environmental conditions as assumed controlled indoor ambient environmental conditions (512). That is, it is assumed that the printing device is located indoors, and not exposed to outside ambient environmental conditions. The environmental conditions of the printing device may thus instead be assumed as nominal controlled indoor ambient environmental conditions, such as a temperature of 70 degrees Fahrenheit and a relative humidity of 40%. It is noted that the computing device may specify the printing device's environmental conditions as assumed controlled indoor ambient environmental conditions when the printing device's location is determined as a default indoor climate-controlled environment, as described above in relation to FIG. 4.

However, if the determined likelihood that the printing device is exposed to outside ambient environmental conditions at its location is greater than a threshold (510), then the computing device may instead look up the outside ambient environmental conditions at this location (514). The computing device may consult a weather conditions database, such as the weather conditions database 113 of FIG. 1. The computing device thus specifies the printing device's environmental conditions as the outside ambient environmental conditions that have been looked up (516).

As been noted, the environmental adjustment factor for a printing device can be determined based on the environmental conditions of the device in a number of different ways. For example, static or dynamic rules may be applied to the printing device's environmental conditions to yield the environmental adjustment factor. The environmental adjustment factor may be determined using a machine learning model, to which the printing device's environmental conditions are input. In such an implementation, data from other printing devices in which actual print material usage is measured can be used to train the machine learning model.

Figure 6:
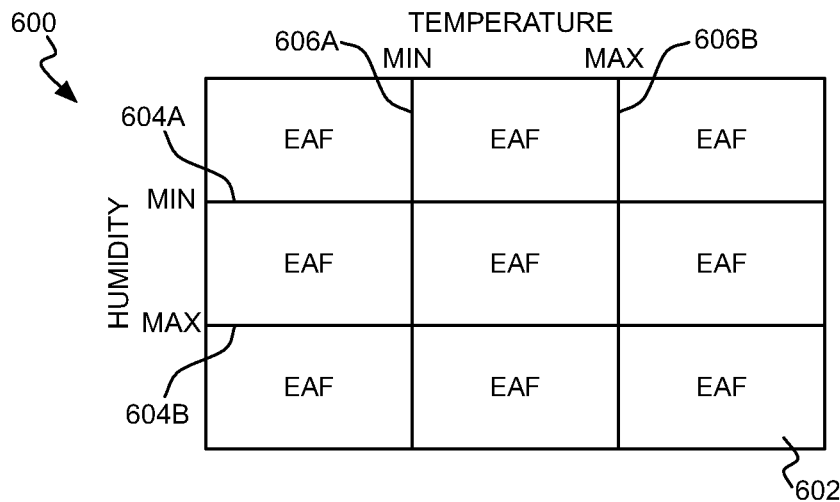
FIG. 6 is a diagram of an example table for determining an environmental adjustment factor based on a printing device's environmental conditions.

FIG. 6 shows an example table that can also be used to determine the environmental adjustment factor for a printing device based on the device's environmental locations. The table 600 particularly specifies the environmental adjustment factor for each of a number of different combinations of temperature and humidity. In the example of FIG. 6, humidity and temperature have each been divided over three ranges, for a total of nine different environmental adjustment factors.

For example, humidity between a minimum humidity 604A and a maximum humidity 604B may correspond to typical humidity found in a climate-controlled indoor environment, such as between 40 and 60% relative humidity. Temperature between a minimum temperature 606A and a maximum temperature 606B may likewise correspond to typical temperatures found in such an environment, such as between 69 and 76 degrees F. Humidity and temperatures outside these respective ranges may thus respectively correspond to low or high humidity and temperature.

The environmental adjustment factor for each combination of temperature and humidity may be determined in a number of different ways. They may be specified based on controlled laboratory experiments in which, for each of a number of print jobs, actual print material usage is measured and divided by predictive print material usage at different humidity and temperature combinations. As another example, the environmental adjustment factors may be determined in a machine learning or other manner based on real world usage of printing devices that can measure their actual environmental conditions as well as their actual print material usage.

Figure 7:
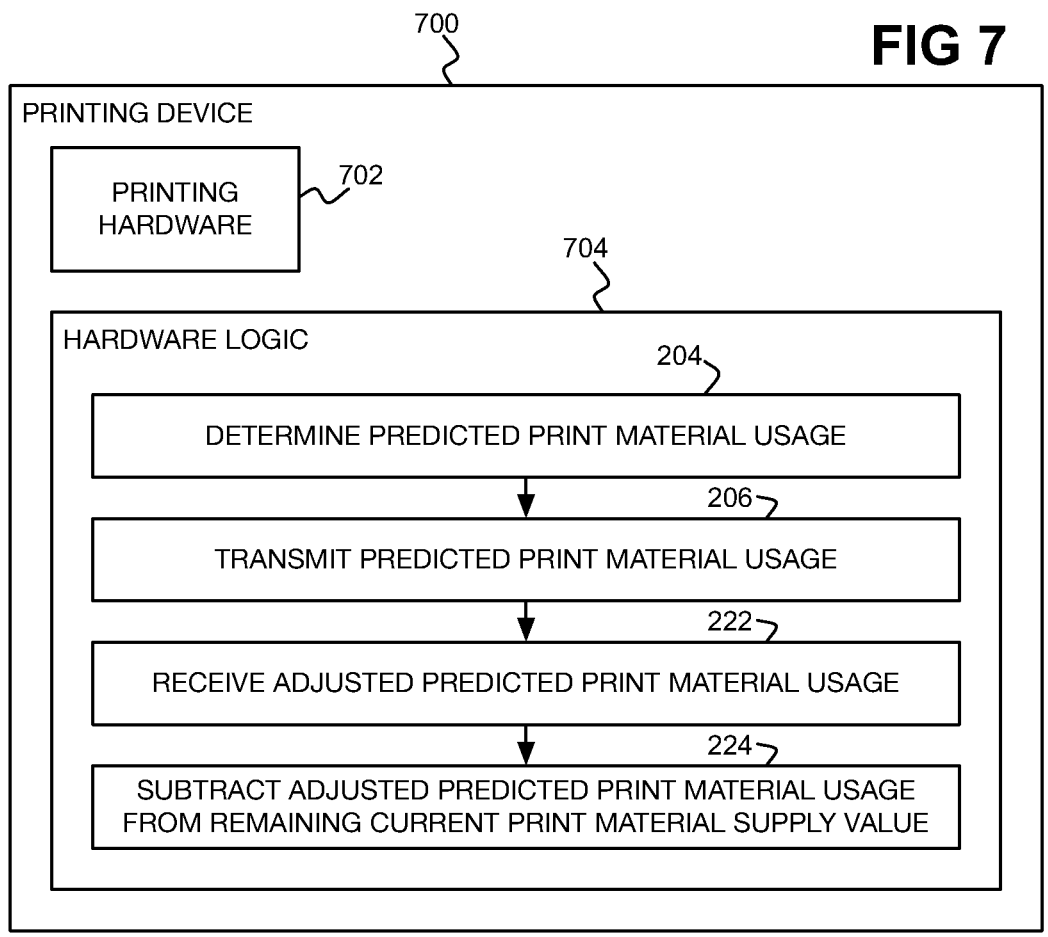
FIG. 7 is a block diagram of an example printing device.

FIG. 7 shows an example printing device 700. The printing device 700 may implement either printing device 102 of FIG. 1, for instance. The printing device 700 can be a standalone printer or an AIO device. The printing device 700 includes printing hardware 702, which includes the hardware parts by which the printing device 700 deposits print material and thus prints a print job using the print material. For example, the printing hardware 702 in the case of a laser-printing device may include the photoconductive drum or other surface, discharge laser or other optical source, fuser, and so on, whereas in the case of an inkjet-printing device may include an inkjet printhead.

The printing device 700 includes hardware logic 704. The hardware logic 704 may be implemented as a processor and a non-transitory computer-readable data storage medium storing program code. For example, the processor may be a general-purpose processor that executes program code stored on a memory. As another example, the processor and the computer-readable data storage medium may be implemented as an application-specific integrated circuit (ASIC) that has been encoded with the program code.

The hardware logic 704 determines a predicted print material usage in printing of the print job (204), and transmits the predicted print material usage (206). The hardware logic 706 responsively receive an adjusted predicted print material usage in printing of the print job based on environmental conditions in which the printing device 700 operated when printing the print job as determined based on a location of the printing device 700 (222). The hardware logic 704 subtracts the adjusted predicted print material usage from a value corresponding to a remaining current supply of the print material available to the printing device 700 (224).

Figure 8:
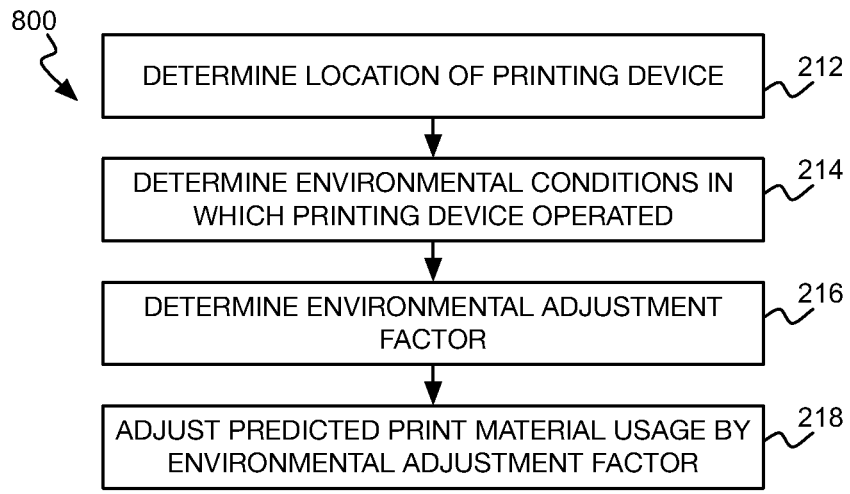
FIG. 8 is a flowchart of an example method.

FIG. 8 shows an example method 800. A processor can perform the method 800. The processor, such as the processor of a printing device like either printing device 102 of FIG. 1, or the processor of a computing device like the computing device 104 of FIG. 1 or a host computing device to which the printing device 102 is directly connected and through which the device 102 may communicate over a network. The method 800 includes determining a location of the printing device (212), and determining environmental conditions in which the printing device operated when printing a print job, based on the determined location (214). The method 800 includes determining an environmental adjustment factor for the printing device based on the environmental conditions (216), and adjusting a predicted print material usage of the printing device in printing the print job, based on the environmental adjustment factor (218).

Figure 9:
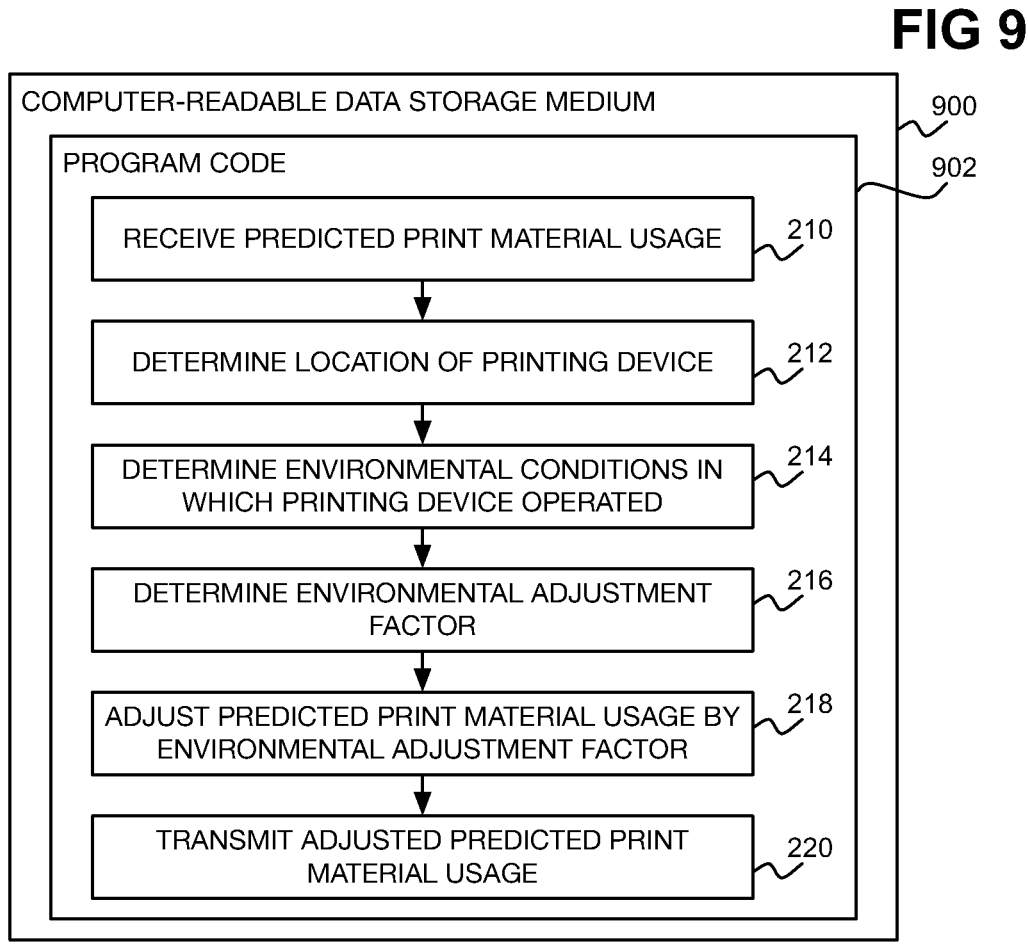
FIG. 9 is a diagram of an example non-transitory computer-readable data storage medium.

FIG. 9 shows an example computer-readable data storage medium 900. The computer-readable data storage medium 900 stores program code 902 executable by a computing device to perform processing. The processing includes receiving, from a printing device, a predicted print material usage of the printing device when printing a print job (210), and determining a location of the printing device (212). The processing includes determining environmental conditions in which the printing device operating when printing the print job, based on the determined location (214).

The processing further includes determining an environment adjustment factor for the printing device based on the determined environmental conditions (216). The processing includes adjusting a predicted print material usage of the printing device when printing the print job, based on the determined environmental adjustment factor (218). The processing includes transmitting, to the printing device, the adjusted predicted print material usage of the printing device in printing the print job (220).

The techniques have been described herein for more accurately tracking the remaining print material supply within a printing device, even if the device and the supply lack a print material sensor and/or the device lacks an environmental sensor. Therefore, premature replacement of the print material supply is less likely to occur. Furthermore, printing device performance is enhanced, insofar as the device is less likely to prematurely switch to a reduced print material usage mode in which print quality is likewise reduced.

We claim:

1. A method comprising:
   determining, by a processor, a location of a printing device when printing a print job;
   determining, by the processor, that a likelihood the printing device was exposed to outside ambient environmental conditions at the determined location is lower than a threshold;
   in response to determining that the likelihood is lower than the threshold, specifying, by the processor, environmental conditions in which the printing device operated when printing the print job as assumed controlled indoor environmental conditions;
   determining, by the processor, an environmental adjustment factor for the printing device based on the determined environmental conditions; and
   adjusting, by the processor, a predicted print material usage of the printing device in printing the print job, based on the determined environmental adjustment factor.

2. The method of claim 1, wherein the processor is to cause the printing device to perform a print material usage-related action based on a remaining print material supply of the printing device calculated using the adjusted predicted print material usage.

3. The method of claim 1, further comprising:
   repeating specifying the environmental conditions and determining the environmental adjustment factor and adjusting the predicted print material usage, each of a plurality of times the printing device prints a new print job.

4. The method of claim 1, wherein determining the location of the printing device comprises:
   determining the location of the printing device by looking up an identifier of the printing device within a geolocation database mapping identifiers to geographic locations.

5. The method of claim 1, wherein determining the location of the printing device comprises:
   determining the location of the printing device by comparing an identifier of the printing device with identifiers of other devices having known locations.

6. The method of claim 1, further comprising:
   determining that the likelihood the printing device was exposed to the outside ambient environmental conditions at the determined location when printing the print job is greater than the threshold;
   in response to determining that the likelihood is greater than the threshold, looking up the outside ambient environmental conditions at the determined location when the printing device printed the print job; and
   specifying the environment conditions in which the printing device operated when printing the print job as the looked-up outside ambient environmental conditions.

7. The method of claim 1, wherein determining the environmental adjustment factor for the printing device comprises:

looking up the determined environmental conditions within a table to determine the environmental adjustment factor;

applying a plurality of rules to the determined environmental conditions to determine the environmental adjustment factor; or determining the environmental adjustment factor for the printing device in a machine learning manner based on the determined environmental conditions.

8. The method of claim 1, wherein the environmental adjustment factor indicates how much more or less print material is used by the printing device when operating in the determined environmental conditions.

9. A printing device comprising:

printing hardware to print a print job using print material; and hardware logic to:

determine a predicted print material usage in printing of the print job;

transmit the predicted print material usage;

responsively receive an adjusted predicted print material usage in printing of the print job based on environmental conditions in which the printing device operated when printing the print job at a determined location of the printing device when printing the print job, the environmental conditions specified as assumed indoor environmental conditions responsive to a determination that a likelihood the printing device was exposed to outside ambient environmental conditions at the determined location being lower than a threshold; and subtract the adjusted predicted print material usage from a value corresponding to a remaining current supply of the print material available to the printing device.

10. The printing device of claim 9, wherein the hardware logic is further to:

perform a print material usage-related action responsive to the value corresponding to the remaining current supply of the print material available to the printing device dropping to less than a threshold.

11. The printing device of claim 9, wherein the hardware logic is to transmit to a computing device an identifier of the printing device with the predicted print material usage, the location of the printing device determined by the computing device based on the identifier of the printing device.

12. A non-transitory computer-readable data storage medium storing program code executable by a computing device to perform processing comprising:

receiving, from a printing device, a predicted print material usage of the printing device when printing a print job;

determining a location of the printing device when printing the print job;

determining that a likelihood the printing device was exposed to outside ambient environmental conditions at the determined location is lower than a threshold;

in response to determining that the likelihood is lower than the threshold, specifying environmental conditions in which the printing device operated when printing the print job as assumed controlled indoor environmental conditions;

determining an environment adjustment factor for the printing device based on the determined environmental conditions;

adjusting a predicted print material usage of the printing device when printing the print job, based on the determined environmental adjustment factor; and transmitting, to the printing device, the adjusted predicted print material usage of the printing device in printing the print job.

13. The non-transitory computer-readable data storage medium of claim 12, wherein an identifier of the printing device is received from the printing device along with the predicted print material usage, and wherein the location of the printing device is determined based on the received identifier of the printing device.

* * * * *